US012473928B1

(12) United States Patent
Lei

(10) Patent No.: US 12,473,928 B1
(45) Date of Patent: Nov. 18, 2025

(54) CONNECTION STRUCTURE FOR FANS OPERATING IN PARALLEL

(71) Applicant: ASIA VITAL COMPONENTS (CHINA) CO., LTD., Shenzhen (CN)

(72) Inventor: Ming Lei, Shenzhen (CN)

(73) Assignee: ASIA VITAL COMPONENTS (CHINA) CO., LTD., Shenzhen (CN)

( * ) Notice: Subject to any disclaimer, the term of this patent is extended or adjusted under 35 U.S.C. 154(b) by 0 days.

(21) Appl. No.: 18/797,284

(22) Filed: Aug. 7, 2024

(51) Int. Cl.

| | |
|---|---|
| ***F04D 29/52*** | (2006.01) |
| ***F04D 25/16*** | (2006.01) |
| ***H01R 13/50*** | (2006.01) |

(52) U.S. Cl.
CPC ......... *F04D 29/522* (2013.01); *F04D 25/166* (2013.01); *H01R 13/50* (2013.01)

(58) Field of Classification Search
CPC .... F04D 29/522; F04D 19/002; F04D 25/166; F04D 25/08
See application file for complete search history.

(56) References Cited

U.S. PATENT DOCUMENTS

2014/0205451 A1* 7/2014 Zhu .................... F04D 25/0693 415/213.1
2015/0167682 A1* 6/2015 Ishihara .............. F04D 25/0686 417/354
2024/0117815 A1 4/2024 Xu
2024/0240649 A1* 7/2024 Zhang ................. F04D 25/0693
2024/0426306 A1* 12/2024 Tsai ...................... F04D 29/522

FOREIGN PATENT DOCUMENTS

TW M634161 U 11/2022
TW I812380 B * 8/2023
TW M662834 U 11/2024

OTHER PUBLICATIONS

Search Report dated Jan. 16, 2025 issued by Taiwan Intellectual Property Office for counterpart application No. 113127904.

* cited by examiner

*Primary Examiner* — Nathaniel E Wiehe
*Assistant Examiner* — Jackson N Gillenwaters
(74) *Attorney, Agent, or Firm* — Demian K. Jackson; Jackson IPG PLLC

(57) ABSTRACT

A connection structure for fans operating in parallel is disclosed and includes two fans and a joint member. The fans respectively have an outer frame, a groove is formed on each of sides of the outer frame; and the grooves on two correspondingly faced sides of the two fans are respectively provided with a fan terminal block therein. The joint member is provided between the two fans to engage with the grooves on the correspondingly faced two sides of the fans. The joint member is provided on two lateral sides thereof at positions corresponding to the fan terminal blocks in the grooves on the two fans with a connector each for electrically connecting to the fan terminal blocks. The fans can be one-by-one snapped together by the joint member that is modularized for wirelessly electrically connecting the two fans in parallel in an easy, quick and accurate manner.

7 Claims, 8 Drawing Sheets

CONNECTION STRUCTURE FOR FANS OPERATING IN PARALLEL

FIELD OF THE INVENTION

The present invention relates to fans operating in parallel, and more particularly, to a connection structure for fans operating in parallel.

BACKGROUND OF THE INVENTION

Presently, for the purpose of electrically connecting two or more fans 11 in parallel without using conductors, connecting terminal blocks 121 are correspondingly provided on the frames 111 of the fans 11 to form a parallelly connected fan structure 1, as shown in FIG. 1.

The parallelly connected fan structure 1 shown in FIG. 1 omits the electrical conductors and the terminal blocks 121 are directly provided on outer sides of the frames 111 of the fans 11 for electrical connecting to each other. To do this, a user has to hold the frames 111 of the fans 11 in the process of connecting the terminal blocks 121. It is uneasy and inconvenient for the user to apply force for aligning the pins on the terminal blocks 121 to connect the terminal blocks 121 correctly. Meanwhile, when connecting the terminal blocks 121, such as a male terminal block and a female terminal block, the terminal blocks 121 must be positioned in correct direction to enable successful connection of the terminal blocks 121 with each other. The user might need to try the alignment and connection of the fans 11 repeatedly to cause lowered operating efficiency in connecting the fans 11 in parallel.

Further, the terminal blocks 121 are protruded from the frames 111 of the fans 11, and this design tends to hinder air from flowing smoothly and accordingly, has an adverse influence on the wind pressure at the flow field of the fans 11 to cause noise during operation of the fans 11.

It is therefore tried by the inventor to solve the shortages of the prior art parallelly connected fan structure by developing an improved connection structure for fans operating in parallel.

SUMMARY OF THE INVENTION

A primary object of the present invention is to provide a connection structure for fans operating in parallel that can overcome the problems in the prior art parallelly connected fan structure.

Another object of the present invention is to provide a connection structure for fans operating in parallel that is not limited by directionality and accordingly, enables a user to easily, quickly, and accurately connect two fans in parallel.

To achieve the above and other objects, the connection structure for fans operating in parallel according to the present invention, also briefly referred to as the fan connection structure herein, includes two fans and a joint member. The fans respectively have an outer frame defining an internal space for receiving a rotor therein. A groove is formed on each of sides of the outer frames; and the grooves on two correspondingly faced sides of the two fans are respectively provided with a fan terminal block therein. The joint member is provided between the two fans to engage with the grooves formed on the correspondingly faced two sides of the fans. The joint member is provided on two lateral sides thereof at positions corresponding to the fan terminal blocks in the grooves of the two fans with a connector each for electrically connecting to the fan terminal blocks, such that the two fans are electrically connected in parallel for operating.

The joint member in the present invention is modularized in design, so that the fans can be one-by-one snapped together by the joint member that can be used to wirelessly electrically connect two fans in parallel in an easy, quick and accurate manner.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
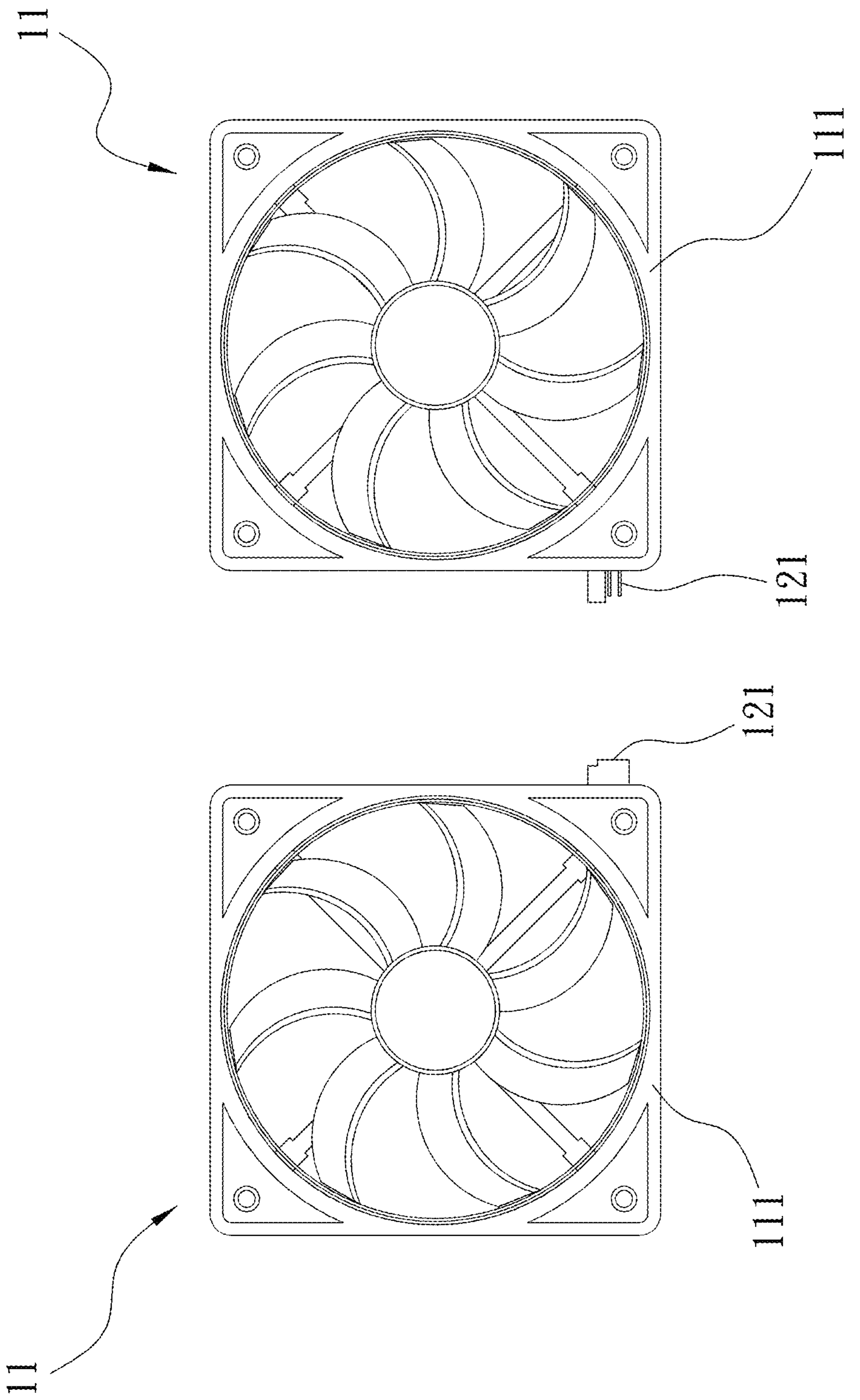
(PRIOR ART) Fig. 1
FIG. 1 shows a conventional parallelly connected fan structure.

The present invention will now be described with some preferred embodiments thereof. For the purpose of easy to understand, elements that are the same in the preferred embodiments are denoted by the same reference numerals.

Figure 2:
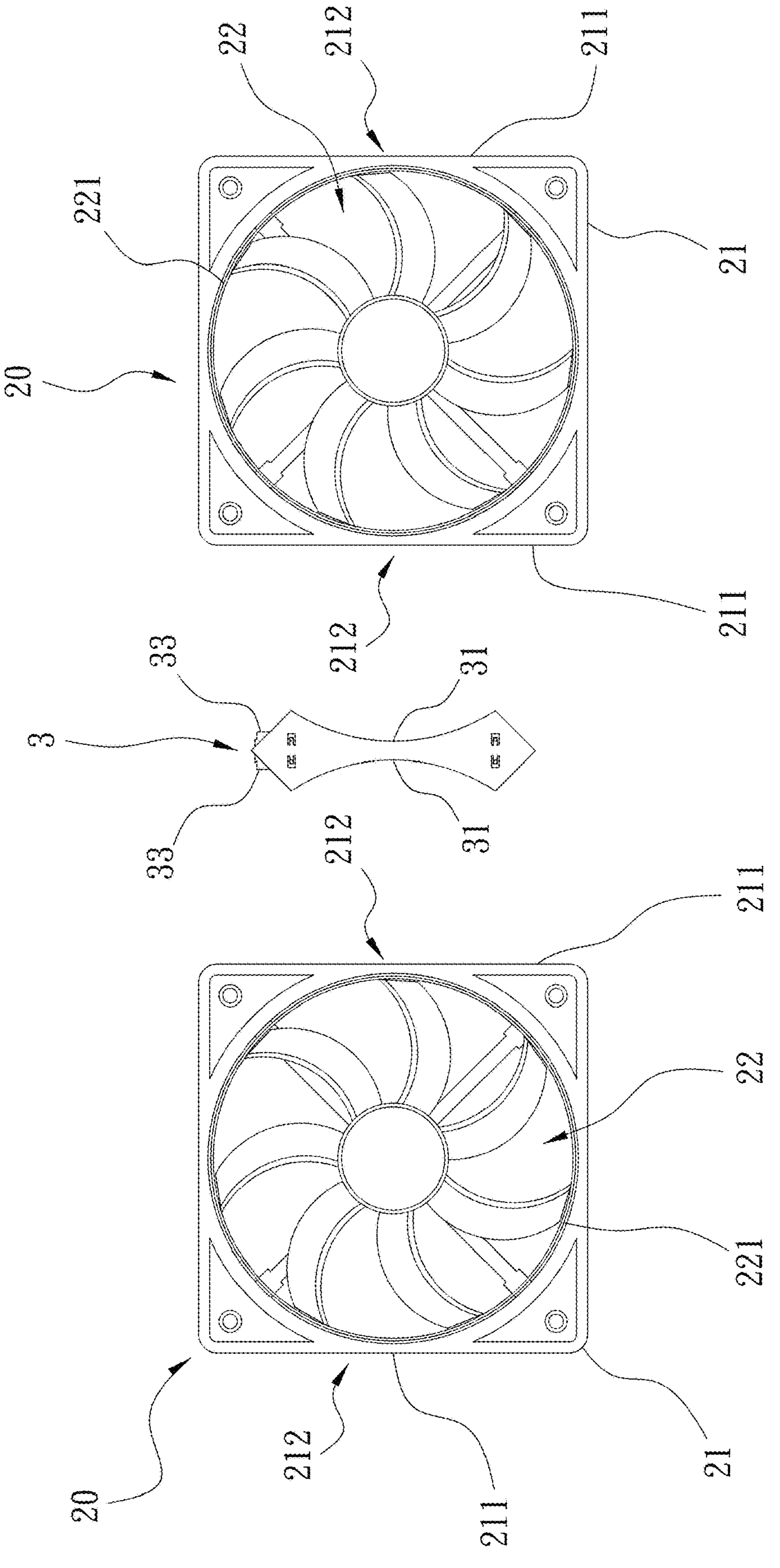
FIG. 2 is an exploded front elevation view showing a connection structure for fans operating in parallel according to a preferred embodiment of the present invention.
Figure 4:
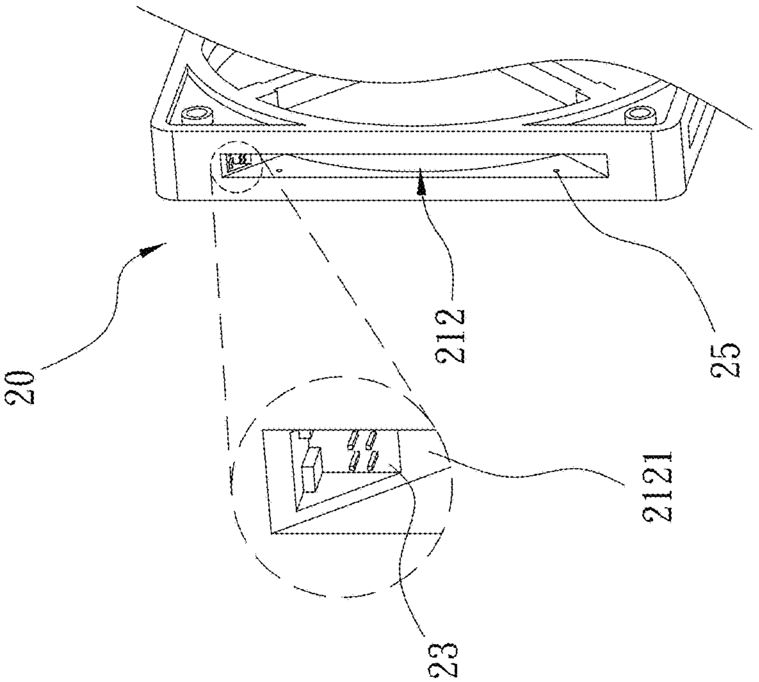
FIGS. 3 and 4 are fragmentary enlarged perspective views showing two correspondingly faced sides of two fans to be connected for operating in parallel according to the preferred embodiment of the present invention.
Figure 3:
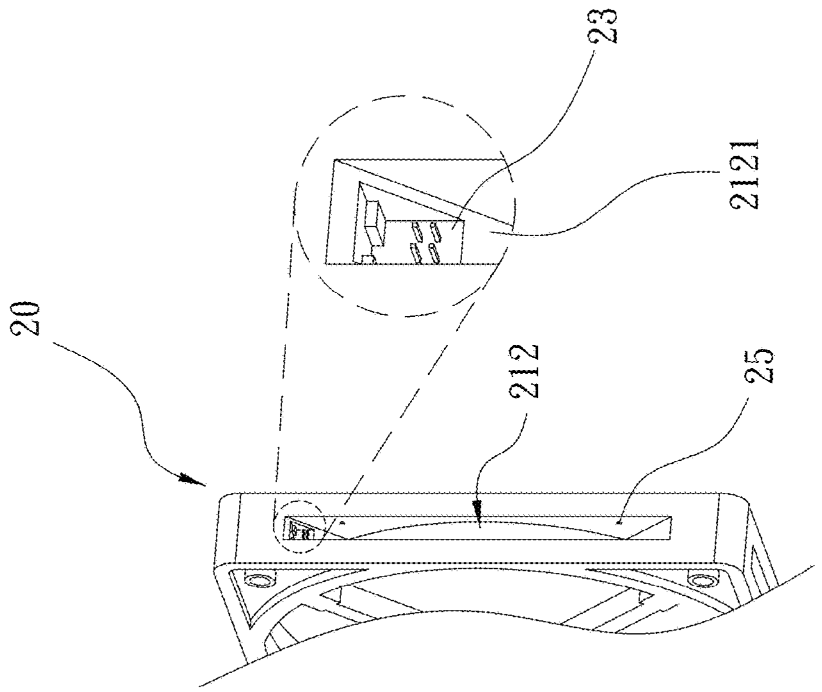
Figure 5:
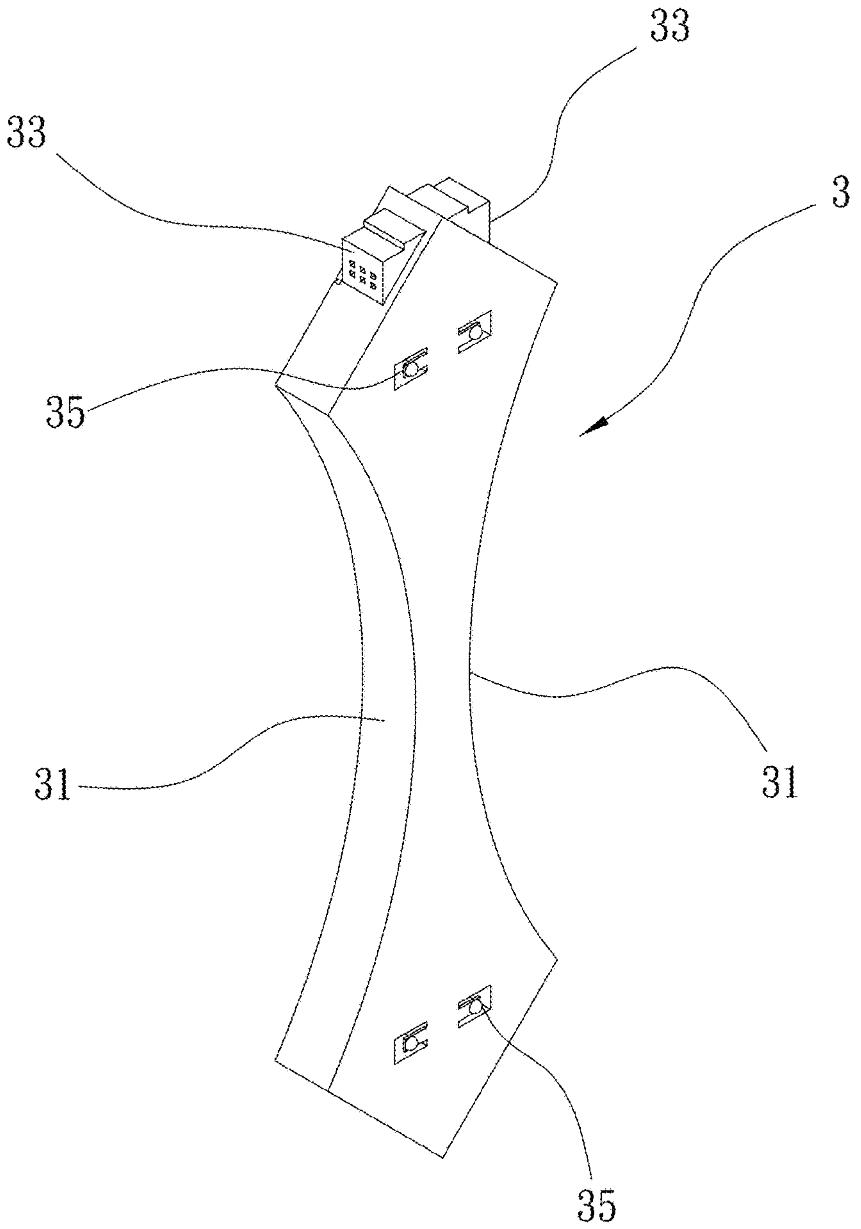
FIG. 5 is a perspective view of a joint member for connecting two fans for operating in parallel according to the preferred embodiment of the present invention.
Figure 6:
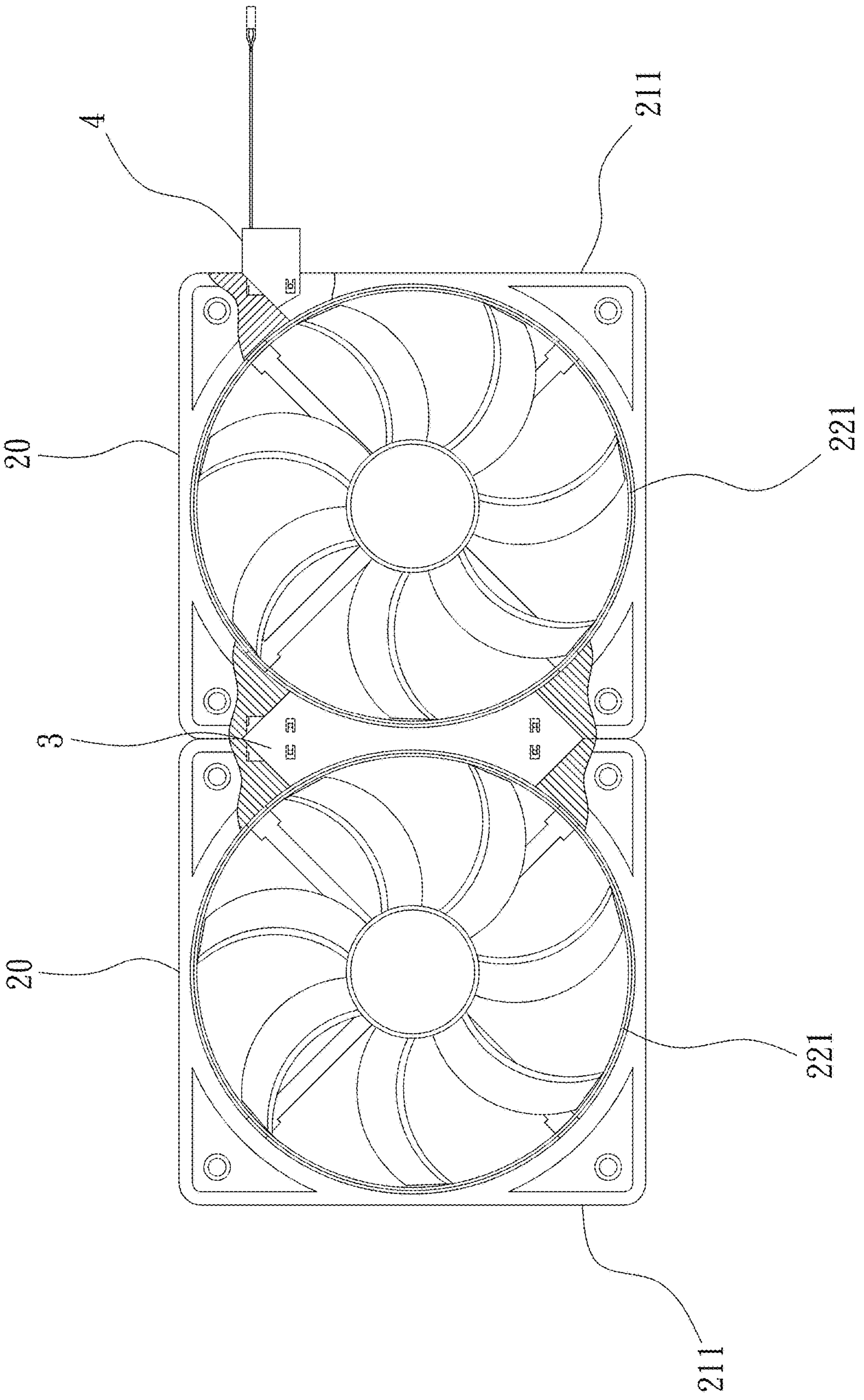
FIG. 6 is an assembled front elevation view with some portions cutaway to show how two fans are connected to operate in parallel according to the preferred embodiment of the present invention.
Figure 7:
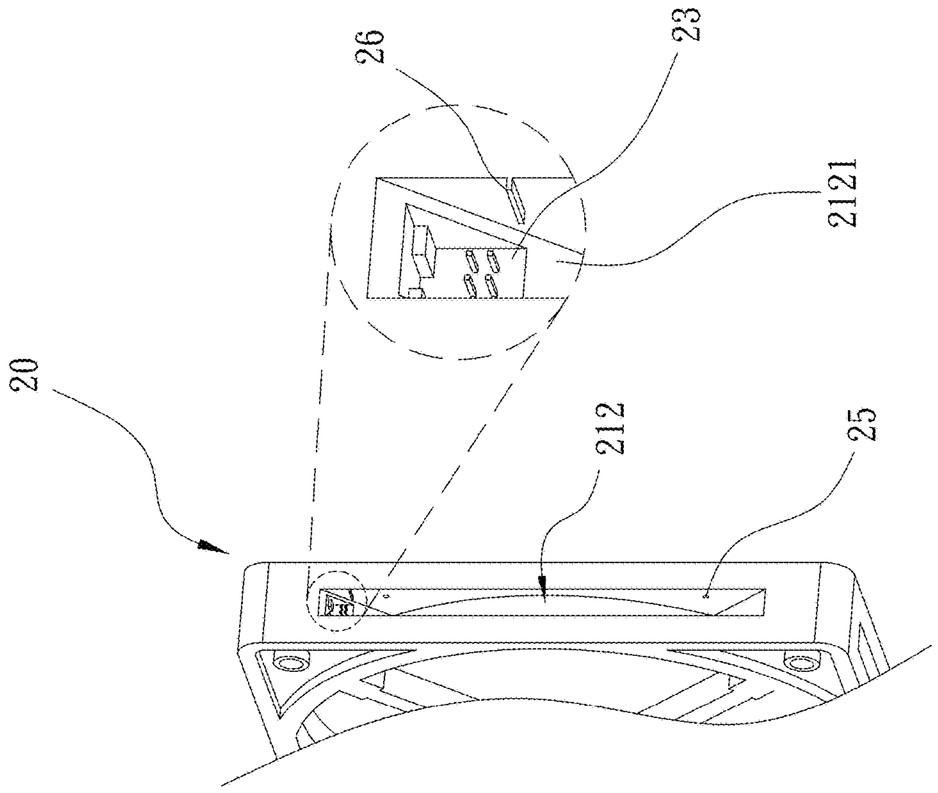
FIG. 7 is a fragmentary enlarged view showing one side of one of the two fans to be connected for operating in parallel according to another embodiment of the present invention.
Figure 8:
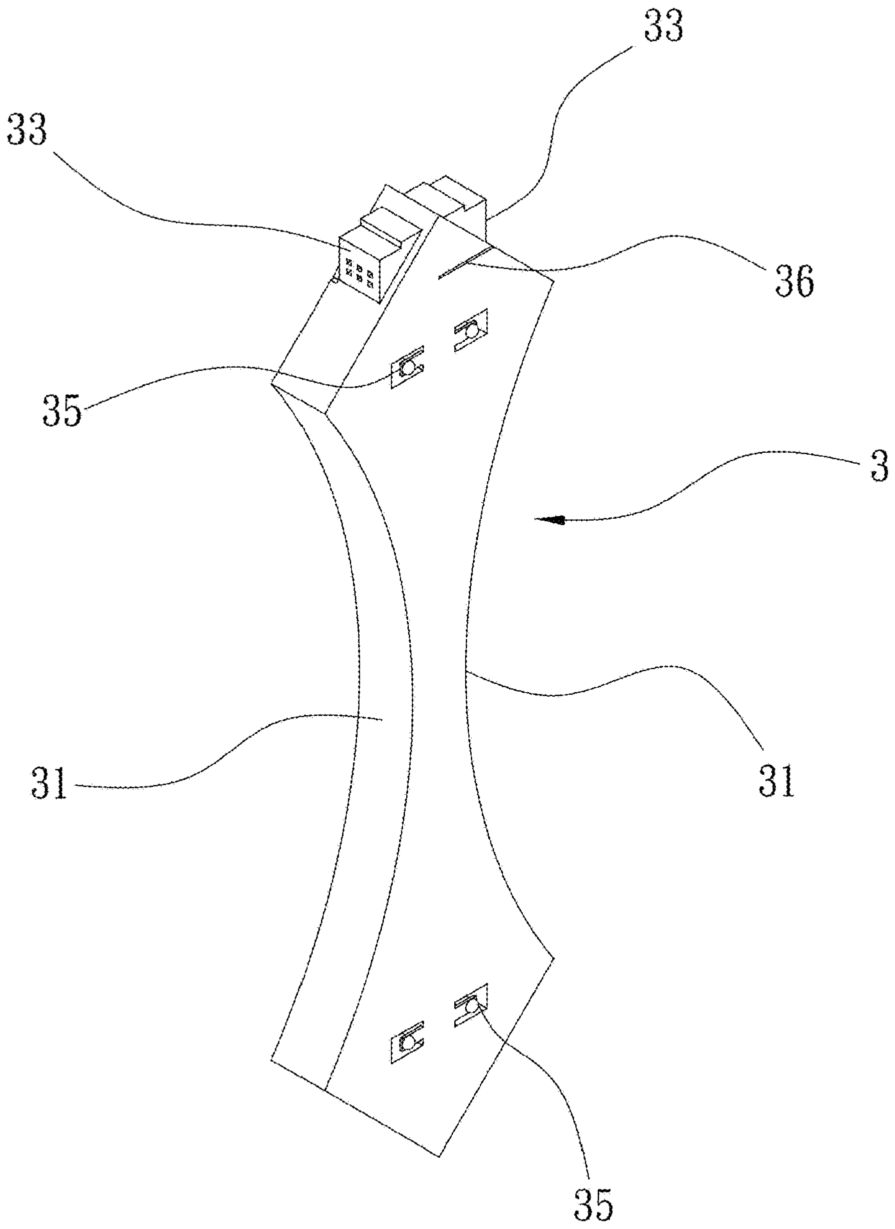
FIG. 8 is a perspective view of a joint member according to another embodiment of the present invention.
Figure 9:
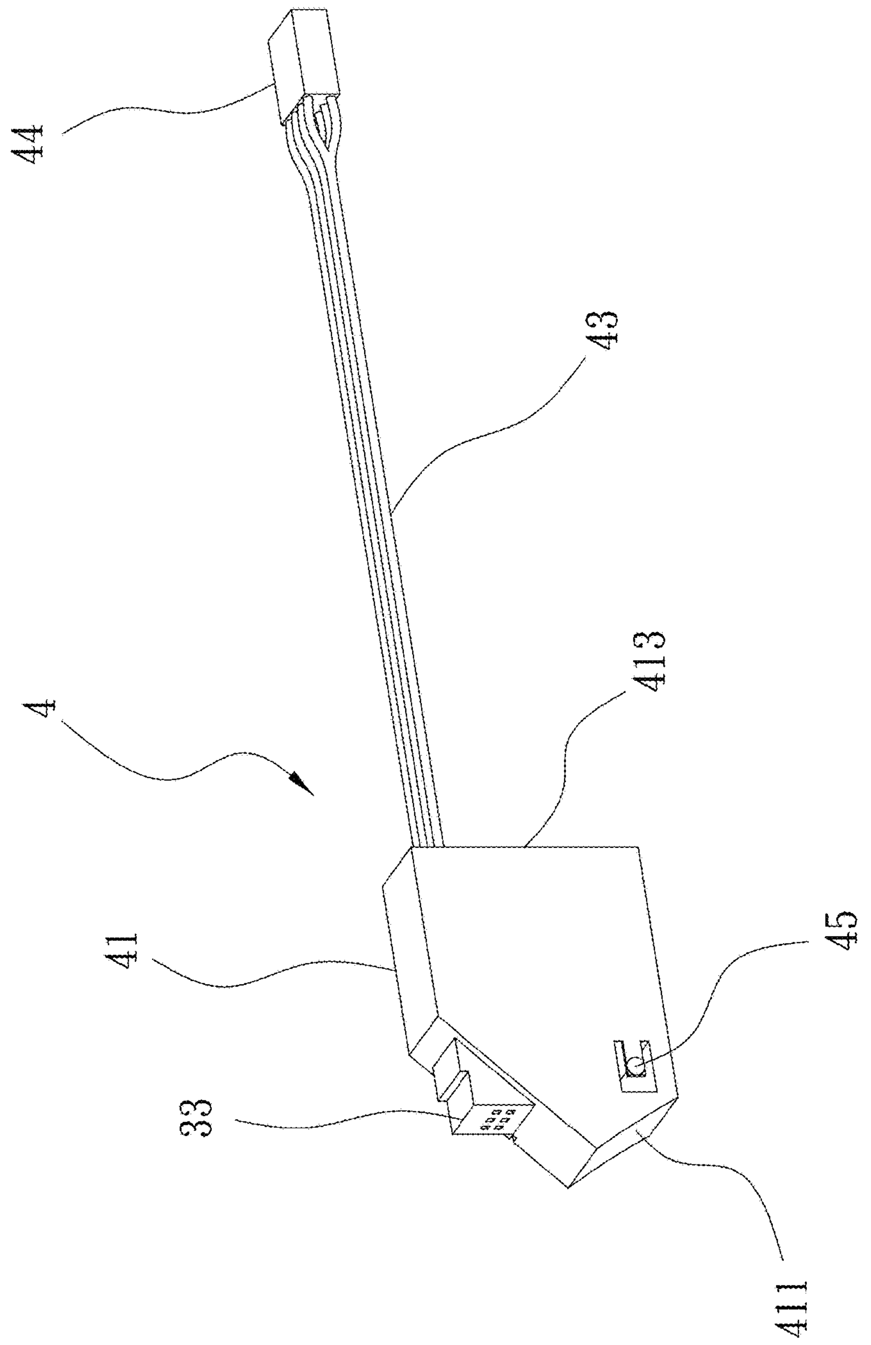
FIG. 9 shows a motherboard conductor assembly for the fans connected in parallel for operating according to the present invention.

In the accompanying drawings, FIG. 2 is an exploded front elevation view of the present invention; FIGS. 3 and 4 show two correspondingly faced sides on two fans to be connected for operating in parallel according to the present invention; FIG. 5 is a perspective view of a joint member for connecting two fans in parallel; FIG. 6 is a partially cutaway elevation view of the present invention, FIG. 7 is a partially enlarged view of another embodiment of the present invention, FIG. 8 shows a joint member according to another embodiment of the present invention, and FIG. 9 shows a motherboard conductor assembly for the present invention.

For the purpose of conciseness and clarity, the connection structure for fans operating in parallel according to the present invention is also briefly referred to as the fan connection structure and generally denoted by reference numeral 2 herein. In practical application of the present invention, the fan connection structure 2 includes at least two fans 20. In a preferred embodiment as shown in FIG. 2, the fan connection structure 2 includes two fans 20, each of which includes an outer frame 21 that defines an internal space 22 for receiving a rotor therein. The rotor is shown in FIG. 2 as an impeller 221 rotatable in the receiving space 22 about a shaft. The outer frame 21 has a groove 212 formed on each of four sides 211 thereof, and the grooves 212 on two correspondingly faced sides 211 of two adjacent fans 20 are respectively provided with a fan terminal block 23 therein, as shown in FIGS. 3 and 4. Each of the grooves 212 is an elongated groove sunken into the side 211 of the outer frame 21 and internally having a curved bottom wall.

Please refer to FIGS. 3 and 4. Each of the grooves 212 has a beveled recess 2121 formed at an upper or a lower end thereof suitable for receiving the fan terminal block 23 therein. In the illustrated preferred embodiment, the fan terminal block 23 is located in the beveled recess 2121 at the upper end of the groove 212. For example, the beveled recess 2121 in each groove 212 may have one fan terminal block 23 provided therein, such that every fan terminal block 23 is fixedly mounted in the beveled recess 2121 to face toward an outer side of the groove 212. While the illustrated preferred embodiment shows two fan terminal blocks 23 are symmetrically provided on two adjacent fans 20, it is understood the preferred embodiment is only illustrative and the two fan terminal blocks 23 may be otherwise asymmetrically arranged. For instance, one of the two fan terminal blocks 23 may be located in the upper end of the groove 212 on one fan 20 while the other fan terminal block 23 is in the lower end of the groove 212 on the adjacent fan 20.

The fan terminal block 23 may be integrally formed with the outer frame 21 when the outer frame 21 is formed by injection molding, so that the fan terminal block 23 is fixedly located in the beveled recess 2121. Alternatively, the outer frame 21 can be consisting of an upper and a lower frame section. In this case, the fan terminal block 23 may be mounted between the upper and the lower frame section. Further, each fan terminal block 23 is electrically connected to a fan circuit board (not shown) in the fan 20 via a conductor assembly (not shown), a printed circuit board (PCB), or a flexible printed circuit (FPC).

Please refer to FIGS. 2, 5 and 6. The fan connection structure 2 further includes a joint member 3, which includes two lateral sides 31 respectively configured corresponding to the grooves 212. The two lateral sides 31 are respectively provided each with a connector 33 for correspondingly connecting to the fan terminal blocks 23 provided in the grooves 212 on two facing sides 211 of the two parallelly arranged fans 20. The joint member 3 is modularized in design and is suitable for easily, quickly and accurately connecting two fans 20 in parallel, allowing the two fans 20 to be electrically connected to each other, i.e., snap together, in parallel between the correspondingly faced left and right sides 211 of the two fans 20. For example, the connectors 33 may be formed on the surfaces of the joint member 3 by extending conducting wires in the joint member 3 out of the two lateral sides 31 of the joint member 3, such that electrical power supply and electrical signal can be transmitted between two fan terminal blocks 23 that are located correspondingly on two fans 20 and are electrically connected via the joint member 3.

The fan terminal block 23 can be one of a male terminal block and a female terminal block, and each of the connectors 33 can be a male connector or a female connector adapted to electrically engage with the male terminal block or the female terminal block of the fan terminal block 23, respectively. For example, the fan terminal block 23 in the groove 212 on the side 211 of one fan 20 can be a male terminal block while another fan terminal block 23 in the groove 212 on the corresponding side 211 of the other fan 20 is a female terminal block. In this case, one of the two connectors 33 on the two lateral sides 31 of the joint member 3 should be a male connector and the other connector 33 should be a female connector to correspond to the two fan terminal blocks 23. Or alternatively, the fan terminal blocks 23 mounted in the grooves 212 on two corresponding sides of the two fans 20 can be both male terminal blocks or both female terminal blocks. In this case, the connectors 33 on the two lateral sides 31 of the joint member 3 should also be both male connectors or both female connectors to correspond to the two fan terminal blocks 23. It is noted that the fan connection structure 2 also provides an error proofing effect when the two fan terminal blocks 23 mounted on the two fans 20 are respectively a male terminal block and a female terminal block. This is because the connectors 33 must also include a male connector and a female conductor for engaging with the male terminal block 23 and the female terminal block 23, respectively. If the connectors 33 on the joint member 3 are incorrectly aligned with the fan terminal blocks 23 on the fans 23, it is impossible to electrically connect the two fans 20 to each other.

To connect two fans 20 in parallel, first position the modularized joint member 3 between the two fans 20 and let one lateral side 31 of the joint member 3 engage with one groove 212 on one of the fans 20 and press against the beveled recess 2121 in the groove 212, so that the fan terminal block 23 is connected to the connector 33 on the lateral side 31 of the joint member 3. Then, align the other lateral side 31 of the joint member 3 with the groove 212 on the other fan 20, such that both lateral sides 31 of the joint member 3 are fully set in the two grooves 212 between the two fans 20. In this way, the two fans 20 can be electrically connected in parallel at their correspondingly faced two sides 211. For example, the joint member 3 preferably has a volume smaller than that of the two fans 20, so that the joint member 3 is invisibly received in the grooves 212 on the two corresponding sides 211 of the two parallelly connected fans 20.

In other operable embodiments, the fan connection structure 2 of the present invention may include more than two fans 20 parallelly connected to one another via more than one joint member 3. In other words, when the fans 20 are more than two in number, they can be sequentially parallelly connected by using only one modularized joint member 3 between any two corresponding sides 211 of two adjacent fans 20. When the joint member 3 has one lateral side 31 engaged with the groove 212 on any side 211 of one fan 20, the other lateral side 31 of the joint member 3 can still be engaged with the groove 212 on any side 211 of another fan 20. In this manner, a plurality of fans 20 can be sequentially electrically connected in parallel via the joint members 3 of the fan connection structure 2 of the present invention to achieve the purpose of electrical power and signal transmission.

With the present invention, no conducting wires are needed. A user needs only to connect the two lateral sides 31 of each joint member 3 to the corresponding grooves 212 located between the two fans 20. The mounting of the joint member 3 is easy and convenient and the connection of two fans 20 in parallel can be completed without the need of holding the outer frames 21 of the fans 20. The user needs only to align the connectors 33 of the joint member 3 with the fan terminal blocks 23 to complete electrical connection between two or more fans 20 and corresponding joint members 3 for electrical power and signal transmission.

And, the joint members 3 can be easily engaged with the fans 20 without the need of trying repeatedly.

Further, with the fan connection structure 2 of the present invention, the fans 20 can be accurately parallelly connected via the modularized joint members 3 and the grooves 212 on the fans 20 in all directions, and is therefore very suitable for the current increasingly developed electronic industry.

In the preferred embodiment of the present invention, each of the grooves 212 on the corresponding sides 211 of the fans 20 is provided with at least one limiting hole 25, and each of the two lateral sides 31 of the joint member 3 is provided with at least one protrusion 35 for correspondingly engaging with the limiting hole 25. With these arrangements, the joint member 3 can be detachably connected to two fans 20 through engagement of the protrusions 35 with the limiting holes 25 without easily separating or dislocating from each other under an external force applied thereto.

FIGS. 7 and 8 show a fan connection structure 2 and a joint member 3 according to another embodiment of the present invention. As can be seen in FIGS. 7 and 8, in the case the fan terminal blocks 23 provided in the grooves 212 on two correspondingly faced sides 211 of two parallelly connected fans 20 all are male terminal blocks or female terminal blocks, the joint member 3 used for engaging with the two fan terminal blocks 23 may be further provided at one of the two lateral sides 31 of the joint member 3 with an error proofing slit 36 (see FIG. 8), and the fans 20 may be respectively provided in the grooves 212 on one of the correspondingly faced sides 211 with an error proofing rib 26 (see FIG. 7) for engaging with the error proofing slit 36, so as to avoid the joint member 3 from being wrongly connected to the fan terminal blocks 23 to cause undesirable damage thereof. In detail, the error proofing slit 36 is extending from one lateral side 31 of the joint member 3 toward the other lateral side 31 by a predetermined length for engaging with the error proofing rib 26 when the joint member 3 is fitted into the groove 212 to form a mortise and tenon joint between them.

Please refer to FIG. 9 along with FIGS. 3, 4 and 6. At least one of the two parallelly connected fans 20 is further provided at the groove 212 on one side 211 opposite to the correspondingly faced sides 211 with an additional fan terminal block 23, and the fan connection structure 2 further includes a motherboard conductor assembly 4. The motherboard conductor assembly 4 includes a tenon section 41 having a connector 33 provided at a front end 411 thereof for engaging with the additional fan terminal block 23 on the fan 20. The tenon section 41 has a rear end 413 provided with a flat cable 43, which has a flat cable terminal block 44 connected to a distal end thereof for connecting to a motherboard (not shown). With this arrangement, the fan connection structure 2 of the present invention can be electrically connected to the motherboard via the motherboard conductor assembly 4 to enable transmission of electrical power and signal. To ensure firm and stable connection of the motherboard conductor assembly 4 to the fan 20, the fan 20 with the additional fan terminal block 23 is further provided in the groove 212 of the side 211 opposite to the correspondingly faced sides 211 with the limiting hole 25 and the tenon section 41 is further provided with at least one connection guiding protrusion 45 for correspondingly engaging with the limiting hole 25 in the groove 212, so that the fan 20 and the motherboard conductor assembly 4 are not easily separated or dislocated from each other under an external force.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A connection structure for fans operating in parallel comprising:

two fans, each respectively defining an axial direction and having an outer frame defining a receiving space for receiving a rotor therein, a groove provided on one or more sides of the outer frame, and a fan terminal block formed in the grooves on correspondingly facing sides of each of the two fans respectively and a joint member provided between the two fans to engage perpendicularly to the respective axial direction with and to be concealed by the grooves formed on the correspondingly facing sides of the respective two fans; the joint member having two connectors, each provided on opposite lateral sides of the joint member at positions corresponding to the fan terminal blocks in the grooves on the two fans for connecting to the fan terminal blocks perpendicularly to the respective axial direction, such that the joint member is fully seated in the two opposed grooves and the two fans are electrically connected in parallel therewith.

2. The connection structure for fans operating in parallel as claimed in claim 1, wherein the fan terminal blocks are both male terminal blocks, and the connectors are both female connectors.

3. The connection structure for fans operating in parallel as claimed in claim 1, wherein the grooves on the correspondingly facing sides of the two fans are respectively provided with at least one limiting hole, and the joint member is provided on each of the opposite lateral sides with at least one protrusion for engaging with one of the limiting holes.

4. The connection structure for fans operating in parallel as claimed in claim 1, wherein one of the two fans is further provided with an additional groove formed on one side of the outer frame opposite to the correspondingly faced sides with a further fan terminal block for electrically connecting to a motherboard conductor assembly.

5. The connection structure for fans operating in parallel as claimed in claim 4, wherein the motherboard conductor assembly includes a tenon section, which has a front end provided with a further connector for correspondingly electrically connecting to the further fan terminal block, and a rear end having a flat cable connected thereto, and the flat cable having a flat cable terminal block provided at a distal end thereof.

6. The connection structure for fans operating in parallel as claimed in claim 5, wherein the one fan is provided with at least one further limiting hole, and the tenon section is correspondingly provided with at least one connection guiding protrusion for engaging with the further limiting hole.

7. The connection structure for fans operating in parallel as claimed in claim 1, wherein the joint member is provided on one of the opposite lateral sides with an error proofing slit, and wherein each of the two fans is respectively provided with an error proofing rib in the groove on the correspondingly facing sides engaging with the error proofing slit on the joint member.

* * * * *